Patented May 29, 1923.

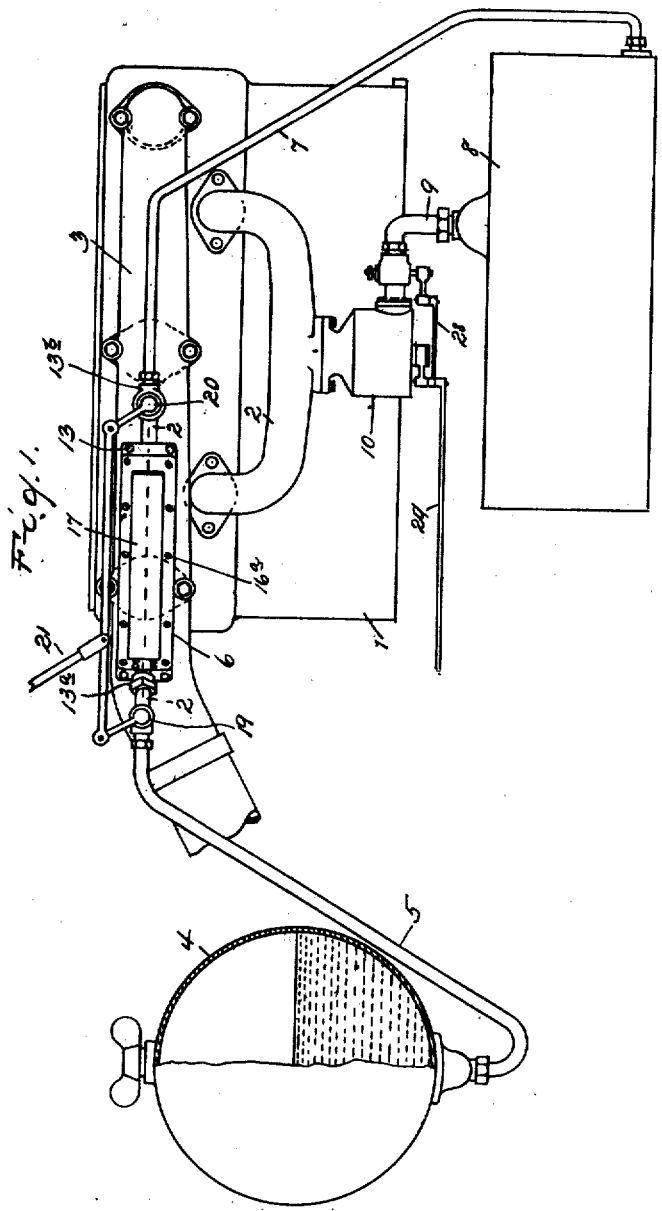

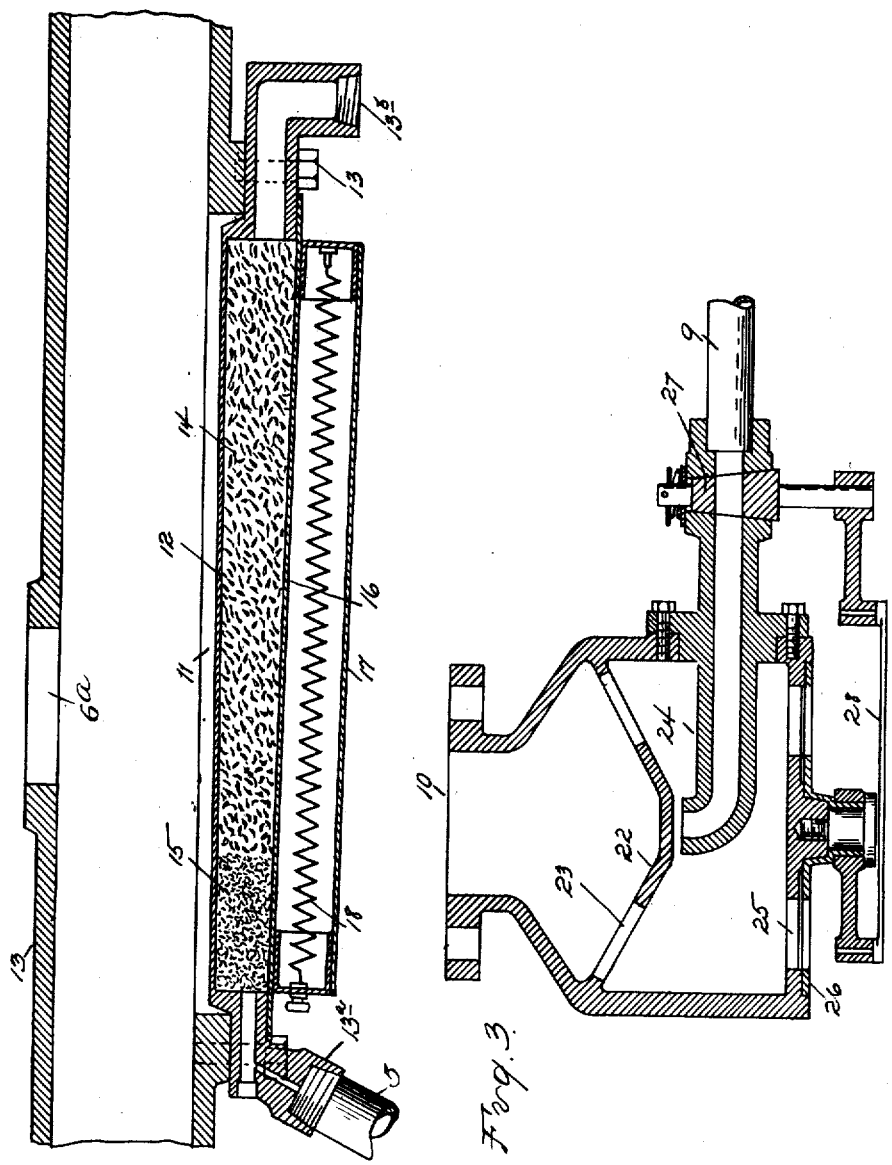

1,456,986

UNITED STATES PATENT OFFICE.

NICOLAS LEISTEN AND CHARLES SENN, OF DETROIT, MICHIGAN.

GAS GENERATOR FOR INTERNAL-COMBUSTION ENGINES.

Application filed February 20, 1920. Serial No. 360,185.

*To all whom it may concern:*

Be it known that we, NICOLAS LEISTEN and CHARLES SENN, both citizens of the United States of America, both residing at Detroit, in the county of Wayne and State of Michigan, have invented certain new and useful Improvements in Gas Generators for Internal-Combustion Engines, of which the following is a specification, reference being had therein to the accompanying drawings.

This invention relates to gas generators for internal combustion engines and more particularly for the engines of motor vehicles.

It is the object of the invention to provide means for heating a liquid fuel preferably by means of the exhaust gases from the engine and substantially at the rate that such fuel is required for use, the liquid being thus transformed into a gas, and to provide means for storing a quantity of said gas and for commingling the proper proportion of air therewith and delivering the same to the engine.

The invention consists in the structural features and arrangements of parts hereinafter fully described and illustrated in the accompanying drawings; wherein—

Figure 1 is a view in side elevation of an engine provided with a fuel vaporizer in accordance with the invention;

Figure 2 is a sectional view of the fuel heater and vaporizer taken on line 2—2 of Figure 1;

Figure 3 is a vertical sectional view of the gas and air mixer;

In these views the reference character 1 designates an internal combustion engine, having the intake manifold 2 and exhaust manifold 3 and deriving its fuel supply initially from a tank 4, wherein the fuel in liquid form may be subjected to air pressure in the usual well known manner to effect delivery thereof to the vaporizing means presently to be described. A fuel delivery pipe leading from the tank 4 is indicated at 5, and 6 is a gas generator mounted upon the exhaust manifold preferably directly opposite the exhaust port 6ª of the last cylinder discharging into said manifold, said generator receiving a fuel supply through the pipe 5. The gas discharging from the generator 6 is carried through a pipe 7 to a gas storage tank 8, whence it is adapted to be delivered by way of a pipe 9 and a gas and air mixer 10 to the intake manifold 2. The general arrangement so far described is illustrated in Figure 1.

Describing now the detailed construction of the gas generator, the exhaust manifold 3 is provided with a rectangular lateral opening 11, which opening is closed by the casing 12 of the gas generator, said casing having a portion projecting into said open-in, as is clearly seen in Figure 2, and being secured in place by cap screws 13. Said casing is integrally formed at its respective ends with intake and outlet fittings 13ª and 13ᵇ, respectively, and is primarily filled with fine steel shavings 14, but also contains, adjacent the inlet, a porous mass of asbestos, as is indicated at 15. Said casing 12 is provided with a closure 16 secured thereto by the screws 16ª and upon the outer surface of said closure there is mounted a rectangular casing 17 containing one or more electrical resistors 18 preferably coiled. Valves 19 and 20 are provided to control respectively an inflow of liquid fuel and the discharge of gas from the casing 12, and are controlled in common by a lever 21.

The gas and air mixer 10 consists of a casing having therein a dished partition 22 having passages 23 therethrough, beneath the center of which partition is arranged the up-turned outlet of a gas discharge nozzle 24, to which the pipe 9 is connected. The bottom of said casing is provided with a series of air inlets 25 controlled by a rotative shutter 26. The gas supply from the pipe 9 to the nozzle 24 is controlled by the valve 27, and said valve and the shutter 26 are linked together as indicated at 28 for actuation in common by a rod 29.

In the operation of the described construction, in case a relatively heavy fuel, such as kerosene is employed, the initial vaporization thereof may be effected by the electric-heater 18 which, if desired, may be shut off after the manifold has been raised to its normal operating temperature. The vaporization of the fuel, however, may be effected either jointly or individually by either the electric heater means or by the exhaust heat, whether the fuel is of a heavy or light nature, if desired. A very effective transmission of heat to the liquid fuel is accomplished by passing the fuel through the porous asbestos and through the fine steel shavings, these substances being of a nature to readily take up the heat generated either electrically or transmitted from the manifold 3 and readily dissipating this heat to the fuel. By properly proportioning the area of the heater exposed to the hot gases or to the heat of the resistor 18, a vaporization of the liquid fuel may be effected without carbonization thereof. The gas thus formed will be delivered to the tank 8 and thence to the mixing device 10, the shutter valve 26 and valve 27 being adjusted to proportionately increase or diminish the supply of gas and air according as it is desired to accelerate or retard the engine. The tank 8 is advantageous in providing a reserve supply of the gas on which to start the engine, the reserve being drawn upon also to effect a quick acceleration.

The described gas vaporizing and air mixing device permits the delivery to the engine of a more highly combustible mixture than is obtained by merely carbureting air as has heretofore been the common practice.

By locating the gas generator directly opposite the last exhaust port 6ª of the engine, a maximum heating effect is secured since the culminated heat resulting from the discharge of all the exhaust ports act upon the generator in the specified location.

The finely divided asbestos which is first encountered by the liquid fuel as it enters the casing of the gas generator is particularly important in starting, to prevent the liquid fuel passing through the casing too freely before the temperature of the casing has been raised to a sufficient temperature to vaporize such fuel.

What we claim as our invention is:

1. In a device of the character described, the combination with an internal combustion engine and a liquid fuel supply tank therefor, of means employing the exhaust head of said engine to transform the liquid fuel from said tank into a gas, storage means for said gas, a supply connection from said storage means to the engine, a gas and air mixer in said supply connection, valves for controlling said gas and air and a common means for operating said valves.

2. In a gas generator for internal combustion engines, the combination with an exhaust manifold having an opening therein, opposite one of the exhaust ports, of a casing forming a closure for said opening and having a liquid fuel inlet and a gas outlet at its respective ends, and a filling within said casing of finely divided heat conducting particles for transmitting the heat from the exhaust gases to the liquid fuel delivered to said casing.

3. In a gas generator for internal combustion engines, the combination with an engine exhaust manifold, of a casing mounted upon and forming a part of said manifold and provided at its respective ends with a liquid intake and a gas outlet, porous material within said casing intermediate said inlet and outlet for transmitting heat to the liquid fuel and vaporizing the same, a closure for said casing and an electric heater carried by said closure.

4. In a gas generator for internal combustion engines, the combination with an engine exhaust manifold, of a casing forming a part of said manifold, and having a liquid intake and a gas outlet, means within said casing for expediting a transfer of heat from the casing to its fluid contents, a closure for said casing, and an electric heater carried by said closure.

5. In a gas generator for internal combustion engines, the combination with an exhaust manifold having an opening therein opposite one of the ports of said manifold, of a casing secured to said manifold forming a closure for said opening and partially projecting into said opening, a detachable cover member for said casing, and an electric heater mounted upon said cover member.

In testimony whereof we affix our signatures.

NICOLAS LEISTEN.
CHARLES SENN.